(12) United States Patent
Veas

(10) Patent No.: US 7,128,794 B2
(45) Date of Patent: Oct. 31, 2006

(54) METHOD FOR RETREADING A TIRE

(75) Inventor: Claudina Veas, Greenville, SC (US)

(73) Assignee: Michelin Recherche et Technique S.A., Granges Paccot (CH)

( * ) Notice: Subject to any disclaimer, the term of this patent is extended or adjusted under 35 U.S.C. 154(b) by 0 days.

(21) Appl. No.: 10/283,667

(22) Filed: Oct. 30, 2002

(65) Prior Publication Data

US 2004/0079459 A1    Apr. 29, 2004

Related U.S. Application Data

(60) Provisional application No. 60/340,593, filed on Oct. 30, 2001.

(51) Int. Cl.
*B29D 30/56* (2006.01)

(52) U.S. Cl. ...................... 156/96; 156/128.1

(58) Field of Classification Search .................. 156/96, 156/127, 128.1, 128.6, 129, 130; 427/208.2, 427/207.1, 425, 427.6
See application file for complete search history.

(56) References Cited

U.S. PATENT DOCUMENTS

| 1,537,866 | A | * | 5/1925 | Morton | 156/184 |
| 1,777,960 | A | * | 10/1930 | Cadwell | 428/493 |
| 2,560,040 | A | * | 7/1951 | Whipple | 428/494 |
| 3,198,680 | A | * | 8/1965 | Iknayan | 156/96 |
| 4,051,090 | A | * | 9/1977 | Horowitz et al. | 524/322 |
| 5,066,522 | A | * | 11/1991 | Cole et al. | 427/422 |
| 5,279,784 | A | * | 1/1994 | Bender et al. | 264/236 |
| 5,807,918 | A | * | 9/1998 | Carter | 524/495 |

\* cited by examiner

*Primary Examiner*—Geoffrey L. Knable
(74) *Attorney, Agent, or Firm*—Frank J. Campigotto; E. Martin Remick; Adam Arnold

(57) ABSTRACT

The invention is a method for retreading a tire comprising the step of using a supercritical fluid as a carrier to spray a gum cushion layer on the outer surface (radially outermost) of the carcass of a tire. In a preferred embodiment of the invention, the supercritical fluid is carbon dioxide. In one embodiment of the invention, the supercritical fluid is a mixture of a rubber product, a solvent, and a supercritical fluid carrier. In another embodiment of the invention, the gum cushion rubber delivered by the supercritical fluid forms a layer less than 300 microns thick between the new tread and the upper surface of the carcass of the tire after curing. In another embodiment of the invention, the gum cushion layer is delivered to the carcass by means of a supercritical fluid as a dual solution system, composed of one solution without sulfur, and one solution without accelerator.

14 Claims, No Drawings

METHOD FOR RETREADING A TIRE

This application claims the benefit of U.S. Provisional Application No. 60/340,593, filed Oct. 30, 2001.

FIELD OF THE INVENTION

The present invention is in the field of retreaded tires.

BACKGROUND OF THE INVENTION

The market for retreaded pneumatic tires is almost entirely a trucking market. In the trucking market, the carcass of a tire is expected to last several hundred thousand miles, and be amenable to having a new tread adhered to it several times. New truck tires are quite expensive, and are therefore bought with the expectation that their high initial costs are offset by the long service life of the carcass, and the low comparative cost of retreading.

A variety of procedures and different types of equipment are available for use in recapping or retreading pneumatic tires. One of the first steps in retreading a worn tire is to remove existing tread material from the tire carcass by a sanding procedure known as buffing. Next a layer of what is known as "cushion gum" is applied to the carcass. This layer of extruded uncured rubber may be stitched or adhesively bonded to the carcass. Next, a tread layer is applied atop the layer of cushion gum. In the cold recapping process, the tread is cured rubber, and has a tread pattern already impressed in its outer surface. The tire is then placed in an autoclave, and heated under pressure for an appropriate time to induce curing of the gum layer, and binding of the gum layer to the tread and the carcass. In the hot recapping process, the tread is uncured rubber, and has no tread pattern. The tire is then placed in a tire mold and heated under pressure for an appropriate time to cure the gum layer and the tread, and to cause the gum layer to bind with the tread and the carcass. [The term "cure" refers to the formation of cross-links between the elastomer molecules in the rubber compound].

The "cushion gum" layer binding the new tread to the old carcass can be relatively expensive. With present tire retreading techniques, this layer is typically 1 millimeter to about 1.5 millimeters thick. It would be an a great advantage to a retreading operation to reduce the thickness of this layer while preserving the strength and durability of the bonds between the tread, gum layer, and carcass.

SUMMARY OF THE INVENTION

The invention is a method for retreading a tire comprising the step of using a supercritical fluid to spray a gum cushion layer on the outer surface (radially outermost) of the carcass of a tire. In a preferred embodiment of the invention, the supercritical fluid is carbon dioxide. In one embodiment of the invention, the sprayed product is a mixture of a rubber product, a solvent, and a supercritical fluid carrier. In another embodiment of the invention, the gum cushion rubber in the process forms a layer at least 300 microns thick between the carcass of the tire and the new tread after curing.

Therefore it is an object of the present invention to provide a re-treading method to secure a new tread to a prepared, old carcass.

Therefore it is an object of the present invention to provide a re-treading method which uses a thinner gum cushion layer of rubber between the new tread and the old, prepared carcass.

Therefore it is an object of the present invention to provide a re-treading method that results in a uniform thickness of the gum cushion layer of rubber between the new tread and the old, prepared carcass.

These and other objects of the invention will become apparent upon inspection of the present specification and the appended claims.

DETAILED DESCRIPTION OF THE INVENTION

The invention is a method for retreading a tire comprising the step of using a supercritical fluid to spray a gum cushion layer of rubber on the outer surface (radially outermost) of the carcass of a tire. In a preferred embodiment of the invention, the supercritical fluid uses a carbon dioxide carrier. In one embodiment of the invention, the rubber delivered in the process forms a layer on average less than 400 microns thick between the carcass of the tire and the new tread after curing. In another embodiment of the invention, the rubber delivered in the process forms a layer less on average than 300 microns thick. In another embodiment of the invention, the rubber delivered in the process forms a layer less on average than 200 microns thick.

According to the present invention, the rubber for the gum cushion layer is typically first put into a solution with a solvent such as heptane, hexane, pentane, VM&P, or naphtha. The solution would then contain between twenty percent (20%) and thirty percent (30%) by weight of the rubber compound. This solution is then applied to the carcass of the tire using a supercritical fluid carrier. In a preferred embodiment of the invention, carbon dioxide is used as the supercritical fluid carrier, and heptane is used as the solvent.

The concentration of rubber in the solution is preferably as high as possible to minimize the amount of solvent sprayed. However, increasing the concentration of rubber increases the viscosity of the solution, which can result in localized excessive heating of the cushion gum during curing, and adversely affect the curing properties of the cushion gum. Therefore, the maximum concentration of the solvent-cushion gum solution is limited by the ability of the spray equipment to handle a high viscosity solution. For example, the solution might have a viscosity of around 11,000 centipoise. One skilled in the art, after reading the instant specification, can determine the ratio of cushion gum to solvent that creates the maximum viscosity that a particular kind of spray equipment can handle without adversely affecting the curing properties of the cushion gum.

The solution must be made hot enough to reach a supercritical state, but preferably is not much hotter. If the spray is too hot, the cushion gum can cure prematurely, perhaps degrading the robustness of the interfaces between the cushion gum, carcass, and new tread, perhaps shortening the useful life of the retreaded tire. The spraying may be carried out at normal ambient air temperatures, for instance, from about 60 degrees Fahrenheit to about 90 degrees Fahrenheit. After spraying a period of time is allowed before applying the new tread to the carcass, perhaps three to five minutes, to give the excess solvent time to evaporate.

Retreading of Tires

Truck tires are typically bought, and sold, with two to three retreading operations in mind. The most excellent brands, for example those sold by Michelin, N.A., Inc., have carcasses that last for several hundred thousand miles, and are expected to undergo several retreading operations, depending upon service conditions.

In a retreading operation, the worn tread of the truck tire is typically sanded off. A thin layer of extruded rubber (the gum cushion layer) is then typically applied to the radially outermost surface of the carcass, then the new tread is applied. The entire tire is then typically cured for an appropriate period of time, securing the new tread to the carcass.

The present invention provides a method for replacing the relatively expensive gum cushion layer of extruded rubber with a much thinner layer of rubber laid down from a rubber solution using a supercritical fluid carrier to spray the solution. The gum cushion layer today is typically formed by extrusion. The extruded layer, therefore, typically can be no thinner than 0.8 millimeters. Usually the gum cushion layer is between one and one and one-half millimeters thick. The gum cushion layer of rubber laid by the present invention can be thinner than 400 microns, and still retain bonding strength needed to maintain the endurance performance of the tire. This can reduce the cost of that layer of rubber as much as eighty percent (80%), by perhaps five dollars (U.S. 5$) or six dollars (U.S. 6$) per truck tire. Just as importantly, through the use of the supercritical fluid as a delivery vehicle, the rubber to from the solution fills completely all the cavities of the buffed carcass and it is spread uniformly over the crown of the carcass. Therefore, the mechanical anchorage of the rubber to the carcass is improved and there are no bare or excessively thin spots which could potentially weaken the bond between the carcass and the gum cushion layer. An ordinary spraying mechanism could not provide this degree of thinness, nor could it provide the necessary uniformity because the viscosity of the solution would be too high to be sprayed without the help of a supercritical fluid.

Supercritical Fluids

A supercritical fluid is a dense gas that is maintained above its critical temperature (the temperature above which it cannot be liquefied by pressure). A supercritical fluid is a state of matter between a liquid and a gas. At low pressure, a liquid that gets sufficiently hot will boil to produce a gas. For example, at atmospheric pressure water boils to make steam at 212 degrees Fahrenheit. Above a certain pressure and temperature, however, the distinction between liquid and gas disappears, and a substance enters the supercritical fluid state. Water becomes a supercritical fluid at a pressure roughly 220 times greater than atmospheric pressure.

If a supercritical fluid is cooled while pressure is maintained, it will become a liquid without condensing. If the pressure on a supercritical fluid is lowered while the temperature is maintained, it will become a gas without boiling.

Supercritical fluids are less viscous and diffuse more readily than liquids. Compounds useful as supercritical fluids for the present invention include, but are not limited to: carbon dioxide, ammonia, water, $N_2O$, xenon, krypton, methane, ethane, ethylene, propane, pentane, methanol, ethanol, isopropanol, chlorotrifluoromethane, monofluoromethane, and cyclohexanol. Supercritical fluids evaporate very quickly, often at the point where spray leaves the orifice of the sprayer, and this induces the vaporization of the solvent accompanying the rubber.

A preferred compound for forming a supercritical fluid is carbon dioxide. Carbon dioxide is environmentally benign, non-flammable, cheap, and commercially available in large quantities. Supercritical carbon dioxide also has a high solubility in many coating formulations, and serves as a good viscosity reducer for many polymer solutions. Carbon dioxide, at pressures above 1,050 pounds per square inch and temperatures above 31 degrees centigrade, becomes supercritical.

TABLE 1

Critical temperatures and pressures of some supercritical fluids

| | A | B | C | D |
|---|---|---|---|---|
| $CO_2$ | −78.5 | 31.3 | 72.9 | 0.448 |
| $NH_3$ | −33.35 | 132.4 | 112.5 | 0.235 |
| $H_2O$ | 100.00 | 374.15 | 218.3 | 0.315 |
| $N_2O$ | −88.56 | 36.5 | 71.7 | 0.45 |
| Xenon | −108.3 | 16.6 | 57.6 | 0.118 |
| Krypton | −153.2 | −63.8 | 54.3 | 0.091 |
| Methane | −164.00 | −82.1 | 45.8 | 0.2 |
| Ethane | −88.63 | 32.28 | 48.1 | 0.203 |
| Ethylene | −103.7 | 9.21 | 49.7 | 0.218 |
| Propane | −42.1 | 96.67 | 41.9 | 0.217 |
| Pentane | 36.1 | 196.6 | 33.3 | 0.232 |
| Methanol | 64.7 | 240.5 | 78.9 | 0.272 |
| Ethanol | 78.5 | 243.0 | 63.0 | 0.276 |
| Isopropanol | 82.5 | 235.3 | 47.0 | 0.273 |
| Isobutanol | 108.0 | 275.0 | 42.4 | 0.27 |
| Chlorotrifluoro-methane | −31.2 | 28.0 | 38.7 | 0.579 |
| Monofluoro-methane | −78.4 | 44.6 | 58.0 | 0.3 |
| Cyclohexanol | 155.65 | 356.0 | 38.0 | 0.273 |

A Boiling point (Celsius)
B Critical temp. (Celsius)
C Critical pressure (atmospheres)
D Density (grams/centimeters cubed)

Rubbers Useful with the Present Invention

Rubbers useful with the present invention include natural rubber and synthetic rubbers. These include, but are not limited to, diene elastomers. "Diene" elastomer or rubber is understood to mean, in known manner, an elastomer resulting at least in part (i.e., a homopolymer or a copolymer) from diene monomers (monomers bearing two double carbon-carbon bonds, whether conjugated or not).

In general, "essentially unsaturated" diene elastomer is understood here to mean a diene elastomer resulting at least in part from conjugated diene monomers, having a content of members or units of diene origin (conjugated dienes) which is greater than 15% (mol %).

Thus, for example, elastomers such as butyl rubbers or copolymers of dienes and of alpha-olefins of the EPDM type do not fall within the preceding definition, and may in particular be described as "essentially saturated" diene elastomers (low or very low content of units of diene origin which is always less than 15%).

Within the category of "essentially unsaturated" diene elastomers, "highly unsaturated" diene elastomer is understood to mean in particular a diene elastomer having a content of units of diene origin (conjugated dienes) which is greater than 50%.

These definitions being given, the following are understood more particularly to be meant by diene elastomer capable of being used in the compositions according to the invention:

(a) any homopolymer obtained by polymerisation of a conjugated diene monomer having 4 to 12 carbon atoms;
(b) any copolymer obtained by copolymerisation of one or more dienes conjugated together or with one or more vinyl aromatic compounds having 8 to carbon atoms;
(c) a copolymer of isobutene and isoprene (butyl rubber), and also the halogenated, in particular chlorinated or brominated, versions of this type of copolymer.

Suitable conjugated dienes are, in particular, 1,3-butadiene, 2-methyl-1,3-butadiene, 2,3-di($C_1$-$C_5$ alkyl)-1,3-butadienes such as, for instance, 2,3-dimethyl-1,3-butadiene, 2,3-diethyl-1,3-butadiene, 2-methyl-3-ethyl-1,3-butadiene, 2-methyl-3-isopropyl-1,3-butadiene, an aryl-1,3-butadiene, 1,3- pentadiene and 2,4-hexadiene. Suitable vinyl aromatic compounds are, for example, styrene, ortho-, meta- and para-methylstyrene, the commercial mixture "vinyltoluene", para-tert.-butylstyrene, methoxystyrenes, chlorostyrenes, vinylmesitylene, divinylbenzene and vinylnaphthalene.

The copolymers may contain between 99% and 20% by weight of diene units and between 1% and 80% by weight of vinyl aromatic units. The elastomers may have any microstructure, which is a function of the polymerisation conditions used, in particular of the presence or absence of a modifying and/or randomising agent and the quantities of modifying and/or randomising agent used. The elastomers may for example be block, statistical, sequential or microsequential elastomers, and may be prepared in dispersion or in solution; they may be coupled and/or starred or alternatively functionalised with a coupling and/or starring or functionalising agent.

In summary, particularly preferably, the diene elastomer of the composition according to the invention is selected from the group of highly unsaturated diene elastomers which consists of polybutadienes (BR), polyisoprenes (IR), natural rubber (NR), butadiene copolymers, isoprene copolymers and mixtures of these elastomers.

Such copolymers are more preferably selected from the group which consists of butadiene-styrene copolymers (SBR), butadiene-isoprene copolymers (BIR), isoprene-styrene copolymers (SIR) and isoprene-butadiene-styrene copolymers (SBIR).

Other Substances in the Rubber Formulation

Fillers will typically be included in the rubber formulation. Suitable fillers include carbon black, silica, aluminas, aluminum hydroxide, aluminum silicate ("white fillers"), clays, calcium carbonate, glass fibers, microspheres, polymeric fibers such as polyester, nylon, or aramid fibers. The appropriate level of filler would be known to one of skill in the art after reading the present specification. Other substances may be included in the rubber formulation, such as anti-oxidants, antiozonants, cure accelerators, sulfurs, and tackifiers.

The Supercritical Spray Solution

The amount of supercritical carrier fluid used in any given application depends upon the solubility, the viscosity, the solids level, and the spray temperature and pressure. In one embodiment, the ration of carbon dioxide to the combination of solvent and rubber varies between 1.7:1 and 2.2:1. In one embodiment, a single-phase solution is sprayed. The supercritical fluid spray also contains a solvent, such as heptane, naphtha (CAS No. 8030-30-6), VM&P (Varnish Makers & Painters solvent, CAS No. 8032-39-4) to dissolve the rubber. The supercritical fluid carrier is preferably carbon dioxide.

In one embodiment, the spray solution contains from ten to fifty percent by weight supercritical carbon dioxide. In one embodiment of the invention, the spray pressure can be between 1200 and 1600 pounds per square inch.

Spray mechanisms for delivery of supercritical fluids are commercially available from companies such as Linden Industries, Inc./EMB (EZ Coat Supercritical Spray Unit) Cuyahoga Falls, Ohio. Alternatively, a spray apparatus can be constructed that includes a pressure vessel, heating component, and spray nozzle, all in fluid connection. In one embodiment of the invention, the spray solution can be heated to between 100 to 160 degrees Fahrenheit, to help make carbon dioxide supercritical, and to offset the cooling that occurs as the carbon dioxide expands to free gas in the spray.

Supercritical fluid sprays have a vigorous decompressive atomization that is capable of making a feathered spray that can produce a uniform coating thickness. The coarse droplet size and "fishtail" (wavy) spray of conventional airless sprays are largely avoided. In addition, the large air volume of an air spray is avoided.

In one embodiment of the invention, a colored cushion gum is used to show visually when the radially outermost surface of the carcass of the tire has been fully coated. The colored rubber might have a silica filler and a colorant or dye. In another embodiment of the invention, two different solutions might be sprayed simultaneously with two dedicated spraying heads for these solutions. One solution can be prepared with the original cushion gum formulation, but with the double amount of sulfur and no accelerator. The other solution can be prepared with the original cushion gum formulation, but with a double amount of accelerator and no sulfur. After spraying simultaneously these two solutions, the overall composition of the cushion gum posed on the carcass would have the same composition as the original cushion gum. Maintaining the components of the curing system isolated until spraying lengthens the shelf life of the cushion gum, since curing cannot begin in absence of any component of the curing system.

The invention may be further understood by a reading of the following non-limiting examples.

EXAMPLE 1

Two buffed tire carcasses of dimension 275/80R22.5 were sprayed on their radially outermost surfaces with a 28% by weight solution of rubber in heptane. The solution was of Mooney viscosity 23 ML. The solution had a 1:8:1 ratio by weight of the carbon dioxide to the weight of the rubber plus its heptane solvent. The portion of the carcass that would lie under the tread was covered with a layer of rubber with a thickness between 200 and 683 microns. Four passes of spray from a hand-held spray gun were used to coat to this thickness. The spraying was done as the tire rotated at a constant rate. The density of the cushion gum was approximately 1.095 grams per cubic centimeter, and the area of the tire sprayed was approximately 0.753 squire meters. Therefore, approximately 1611 grams of solvent was used per tire. A pre-cured tread band of Michelin XDHT pattern, 9.5 inches wide, was applied, and the tires cured. The tires thus prepared were tested and the results of the endurance test were equal to those of tires prepared by conventional means (extruded layer of rubber, thicker layer of rubber).

EXAMPLE 2

Two buffed tire carcasses of dimension 275/80R22.5 were sprayed on their radially outermost surfaces with a 24% by weight solution of rubber in heptane. The solution was of Mooney viscosity 31 ML. The solution had a 1:8:1 ratio by weight of the carbon dioxide to the weight of the rubber plus its heptane solvent. The portion of the carcass that would lie under the tread was covered with a layer of rubber with a thickness of between 245 and 890 microns. Eight passes of spray from a hand-held spray gun were used to coat to this thickness. The spraying was done as the tire rotated at a constant rate. The density of the solution of heptane and rubber was approximately 1.099 grams per cubic centimeter, and the area of the tire sprayed was approximately 0.753 square meters. Therefore, approximately 1053 grams of solvent was used per tire. A pre-cured tread band of Michelin XDHT pattern, 9.5 inches wide, was applied, and the tires cured. The tires thus prepared were tested and the results of the endurance test were equal to those of tires prepared by conventional means (extruded layer of rubber, thicker layer of rubber).

Various modifications of the present invention will be apparent to one of skill in the art after reading the foregoing specification, the appended claims, and the attached drawing. These modifications are meant to fall within the scope of the appended claims.

I claim:

1. In a method for retreading a tire by attaching a cured tread to a tire carcass using a cushion gum layer containing rubber as the binder, the improvement comprising the step of spraying the cushion gum layer onto the radially outermost surface of the carcass using a combination of a supercritical fluid and a solvent, wherein the thickness of the cushion gum layer after curing is on average between about 200 microns and about 600 microns.

2. The method of claim 1, wherein the supercritical fluid is chosen from the group consisting of carbon dioxide, ammonia, water, nitrogen oxide, xenon, krypton, methane, ethane, ethylene, propane, pentane, methanol, ethanol, isopropanol, isobutanol, chlorotrifluoromethane, monofluoromethane, and cyclohexanol.

3. The method of claim 2, wherein the supercritical fluid is carbon dioxide.

4. The method of claim 1, wherein the tire is a pneumatic tire.

5. The method of claim 1, wherein the tire is a non-pneumatic tire.

6. The method of claim 1, wherein the rubber is selected from the group consisting or natural rubber, synthetic rubber, and mixtures thereof.

7. The method of claim 6, wherein the rubber is natural rubber.

8. The method of claim 6, wherein the rubber is a synthetic rubber selected from the group consisting of polybutadiene, polyisoprene, butadiene copolymers, isoprene copolymers and mixtures thereof.

9. The method of claim 8, wherein the copolymers are selected from the group consisting of butadiene-styrene copolymers, butadiene-isoprene copolymers, isoprene-styrene copolymers, and isoprene-butadiene-styrene copolymers.

10. The method of claim 1, wherein the cushion gum layer also contains a curing accelerator compound and other compounding ingredients all applied using the said combination of the supercritical fluid and the solvent.

11. The method of claim 1, wherein the solvent is selected from the group consisting of heptane, hexane, pentane, and naphtha.

12. The method of claim 1, wherein the weight ratio of the supercritical fluid to the solvent plus rubber is between 1.7:1 and 2.2:1.

13. The method of claim 1, wherein the thickness of the cushion gum layer after curing is on average between about 200 microns and about 400 microns.

14. The method of claim 1, wherein the thickness of the cushion gum layer after curing is on average between about 200 microns and about 300 microns.

* * * * *